United States Patent [19]

Giddings et al.

[11] Patent Number: 4,770,795

[45] Date of Patent: Sep. 13, 1988

[54] CALCIUM TOLERANT DEFLOCCULANT FOR DRILLING FLUIDS

[75] Inventors: David M. Giddings, Sugar Land, Tex.; Dodd W. Fong, Naperville, Ill.

[73] Assignee: Nalco Chemical Company, Naperville, Ill.

[21] Appl. No.: 88,734

[22] Filed: Aug. 24, 1987

[51] Int. Cl.$^4$ ................................................ C09K 7/02
[52] U.S. Cl. .................................. 252/8.514; 252/8.51
[58] Field of Search ............................ 252/8.51, 8.514

[56] References Cited

U.S. PATENT DOCUMENTS

| | | |
|---|---|---|
| 2,552,775 | 5/1951 | Fischer et al. .................... 252/8.51 |
| 2,650,197 | 8/1953 | Rahn . |
| 2,718,497 | 9/1955 | Oldham et al. . |
| 2,935,504 | 5/1960 | King et al. . |
| 3,266,887 | 8/1966 | Kramer et al. . |
| 3,639,263 | 2/1972 | Troscinski et al. . |
| 3,679,000 | 6/1972 | Kaufman ............................. 166/273 |
| 3,700,728 | 10/1972 | Moschopedis et al. . |
| 3,985,659 | 10/1976 | Felicetta et al. . |
| 4,374,738 | 2/1983 | Kelly . |
| 4,502,964 | 3/1985 | Giddings et al. . |
| 4,502,965 | 3/1985 | Giddings et al. ................... 252/8.51 |
| 4,547,299 | 10/1985 | Lucas . |
| 4,554,307 | 11/1985 | Farrar et al. ..................... 524/445 X |
| 4,650,593 | 3/1987 | Slingerland . |
| 4,652,623 | 3/1987 | Chen et al. ......................... 252/8.51 |
| 4,675,119 | 6/1987 | Farrar et al. ..................... 252/8.514 |
| 4,676,317 | 6/1987 | Fry et al. . |
| 4,680,128 | 7/1987 | Portnoy ......................... 252/8.51 X |

OTHER PUBLICATIONS

American Petroleum Institute, publication RP13 (B), Sixth Edition, Apr. 1976, pp. 1–33, "Standard Procedure for Testing Drilling Fluids".

Primary Examiner—Herbert B. Guynn
Attorney, Agent, or Firm—John G. Premo; Anthony L. Cupoli; Donald G. Epple

[57] ABSTRACT

A high calcium containing drilling fluid having a 0.1–10 pounds per barrel of a deflocculant which is a water-soluble acrylic polymer which contains from 5–50 mole percent of one or more of the following:

Sulfoethyl acrylamide; or
Acrylamide and Sulfoethyl acrylamide; or
Ethyl acrylate and Sulfoethyl acrylamide; or
Acrylamide and Sulfophenyl acrylamide; or
Acrylamide and Sulfomethyl acrylamide.

2 Claims, No Drawings

CALCIUM TOLERANT DEFLOCCULANT FOR DRILLING FLUIDS

INTRODUCTION

The invention relates to a method of preventing the flocculation of drilling fluids which contain high amounts of calcium.

In the drilling of oil wells and other deep weels by rotary drilling processes, it is now the practice to recirculate an aqueous fluid called "drilling mud" down through the hollow drill pipe, acrossthe face of the drill bit, and upward through the drill hole. The drilling mud serves to cool and lubricate the drill bit, to raise the drilling cuttings to the surface of the ground, and to seal the sides of the well to prevent loss of water and drilling fluids into the formation through which the drill hole is being bored. After each passage through the well, the mud is passed through a settling tank or trough wherein the sand and drill cuttings are separated, with or without screening. The fluid is then again pumped into the drill pipe by a mud pump.

In the formulation of drilling fluids, it is common to add a material known as a deflocculant. These deflocculants are usually materials capable of neutralizing positive edge charges of clay particles. Interparticle attractions due to positive edge charges are considered to be the cause of the flocculation of the active components of the fluid.

Common deflocculants used to treat drilling fluids are low molecular weight polyacrylic acids. These polymers are good as deflocculants when the amount of calcium in the drilling flid is relatively low. When the amount of calcium exceeds 100 ppm, polyacrylic acid or other deflocculants such as sodium acid pyrophosphate (SAPP) are not too successful in preventing flocculation.

The invention, therefore, is directed to a method of preventing the flocculation of drilling fluids which contain high amounts of calcium, e.g. greater than 100 ppm.

THE INVENTION

The invention comprises an improved high calcium containing drilling fluid which contains a major portion of drilling fluid and a deflocculating amount of a water-soluble copolymer or terpolymer of acrylic acid which contains from 5–50 mole percent of:

Sulfoethyl acrylamide; or
Acrylamide and Sulfoethyl acrylamide; or
Ethyl acrylate and Sulfoethyl acrylamide; or
Acrylamide and Sulfophenyl acrylamide; or
Acrylamide and Sulfomethyl acrylamide, or a mixture thereof.

In a preferred embodiment of the invention, the copolymer or terpolymer of acrylic acid contains from 5–20 mole percent of one of the above.

Generally, 0.1–2 pounds of polymer per barrel of drilling fluid is sufficient to prevent flocculation of the additives in the drilling fluid, although 0.1–10 pounds per barrel may be needed. The amount of polymer needed is generally related to the solids content of the drilling fluid, so that increases in the solids content of the drilling fluid generally increase the polymer requirements. The dosage may also be regulated so as to provide between 0.1—up to about 2 ppm of polymer per each part of calcium present in the fluid.

The molecular weight of the polymers can vary between as little as 1000 up to as much as 50,000. A preferred molecular weight range is about 4,000 to 20,000.

The polymers of the invention are useful in preventing flocculation of a variety of drilling fluids. These include:

(1) lime muds;
(2) gypsum muds of "gyp muds";
(3) sea water muds;
(4) fresh water muds contaminated with cement or other sources of soluble calcium.

The following table lists polymers actually used by sample number, composition, percent actives and weight average molecular weight:

| SAMPLE NO. | POLYMER COMPOSITION | %** ACTIVES | MW* |
|---|---|---|---|
| 1 | Acrylic Acid/Acrylamide/Sulfoethylacrylamide | 31.9 | 4,530 |
| 2 | Acrylic Acid/Acrylamide/Sulfoethylacrylamide | 31.9 | 10,600 |
| 3 | Acrylic Acid/Acrylamide/Sulfoethylacrylamide | 31.9 | 15,700 |
| 4 | Acrylic Acid/Acrylamide/Sulfomethylacrylamide | 35.8 | 25,000 |
| 5 | Acrylic Acid/Acrylamide/Sulfomethylacrylamide | 30.3 | 4,500 |
| 6 | Acrylic Acid/Acrylamide/Sulfomethylacrylamide | 35.8 | 18,900 |
| 7 | Acrylic acid/Sulfoethyl acrylamide | 17.8 | 30,900 |
| 8 | Acrylic acid/Acrylamide/Sulfoethyl Acrylamide | 30.8 | 14,000 |
| 9 | Acrylic acid/Ethyl acrylate/Sulfoethyl acrylamide | 26.4 | 3,680 |
| 10 | Acrylic acid/Acrylamide/Sulfophenyl Acrylamide | 24.3 | 11,500 |
| 11 | Acrylic acid/Acrylamide/Sulfomethyl Acrylamide | 24.2 | 16,400 |
| 12 | Acrylic acid/Acrylamide/Sulfomethyl Acrylamide | 35.5 | 10,300 |
| 13 | Acrylic acid/Acrylamide/Sulfomethyl Acrylamide | 26.7 | 2,900 |

*Weight average molecular weight determined via GPC using polystyrene sulfonate standard.
**% Actives as the acid

EXAMPLE 1

To illustrate the invention, the following is presented by way of example:

A representative mud system was used for testing these polymers. The composition of the base fluid of Example I was as follows:

300 pounds per barrel (ppb) tap water
20 ppb bentonite clay
30 ppb Kaolinite
276 ppb barite (weighting agent)
pH 10 with sodium hydroxide
1.25 ppb gypsum The compositions of all the examples were prepared in a standard 350 milliliter laboratory barrel. The examples provided were actually performed on a laboratory scale. All compositions specified are presented on the basis of a real barrel (42 gallons). The calculations were made assuming 1 gram per milliliter of water, 1 ppb=1 gram per 350 milliliter in a laboratory barrel.

Initial Rheology—Before Aging

The base fluids of each of the examples was dosed with sample polymer to provide the number of pounds of sample per barrel of drilling fluid indicated in the Tables. With no aging, the following results were obtained with the base fluid of Example I:

| Sample No. | Conc (lb/bbl) | YP | 10 Sec. Gel | 10 Min. Gel |
|---|---|---|---|---|
| 11 (Acrylic acid/Acrylamide/Sulfomethyl Acrylamide) | .25 | 18 | 16 | 20 |
| 11 (Acrylic acid/Acrylamide Sulfomethyl Acrylamide) | .5 | 16 | 15 | 35 |
| 13 (Acrylic acid/Acrylamide Sulfomethyl Acrylamide) | .25 | 22 | 18 | 22 |
| 13 (Acrylic acid/Acrylamide Sulfomethyl Acrylamide) | .5 | 18 | 12 | 40 |
| 12 (Acrylic acid/Acrylamide Sulfomethyl Acrylamide) | .25 | 18 | 13 | 40 |
| 12 (Acrylic acid/Acrylamide Sulfomethyl Acrylamide) | .5 | 11 | 5 | 16 |

*YP = Yield Point. An effective deflocculant reduces the numerical value of the YP. Yield point, 10 second gel and 10 minute gel tests were determined according to the American Petroleum Institute document, API RP 13B, Section 2.

EXAMPLE 2

The composition of the base fluid of Example 1 was aged at 250° F. for sixteen hours. The following results were obtained:

| Sample No. | Conc (lb/bbl) | YP | 10 Sec. Gel | 10 Min. Gel |
|---|---|---|---|---|
| 11 (Acrylic acid/Acrylamide/Sulfomethyl Acrylamide) | .25 | 15 | 24 | 45 |
| 11 (Acrylic acid/Acrylamide Sulfomethyl Acrylamide) | .5 | 13 | 18 | 60 |
| 13 Acrylic acid/Acrylamide Sulfomethyl Acrylamide | .25 | 18 | 22 | 60 |
| 13 (Acrylic acid/Acrylamide Sulfomethyl Acrylamide) | .5 | 18 | 16 | 65 |
| 12 (Acrylic acid/Acrylamide Sulfomethyl Acrylamide) | .25 | 14 | 20 | 70 |
| 12 (Acrylic acid/Acrylamide Sulfomethyl Acrylamide) | .5 | 9 | 4 | 30 |

*YP = Yield Point. An effective deflocculant reduces the numerical value of the YP. Yield point, 10 second gel and 10 minute gel tests were determined according to the American Petroleum Institute document, API RP 13B, Section 2.

EXAMPLE 3

The following mud system was used for testing these polymers. The composition of the base fluid was as follows:

299 pounds per barrel (ppb) tap water
   20 ppb bentonite clay
   30 ppb Kaolinite
   276 ppb barite (weighting agent)
   pH 10 with sodium hydroxide
   1.25 ppb gysum After aging at 250° F. for 16 hours, the following results were obtained:

| Sample No. | YP | Conc lb/bbl | 10 Sec. Gel | 10 Min. Gel |
|---|---|---|---|---|
| 7 (Acrylic acid/ Sulfoethyl acrylamide) | 27 | 0.2 | 13 | 56 |
| 8 (Acrylic acid/acrylamide/Sulfoethyl acrylamide) | 21 | 0.2 | 14 | 42 |
| 9 (Acrylic acid/Ethyl acrylate/Sulfoethyl acrylamide) | 21 | 0.2 | 13 | 41 |
| 10 (Acrylic acid/Acrylamide/Sulfophenyl acrylamide) | 25 | 0.2 | 14 | 45 |

*YP = Yield Point. An effective deflocculant reduces the numerical value of the YP. Yield point, 10 second gel and 10 minute gel tests were determined according to the American Petroleum Institute document, API RP 13B, Section 2.

EXAMPLE 4

In this example, the composition of the base fluid was as follows:

299 pounds per barrel (ppb) tap water
   20 ppb bentonite clay
   30 ppb Kaolinite
   276 ppb barite (weighting agent)
   pH 10 with sodium hydroxide
   1.5 ppb gypsum Without aging, the following results were obtained:

Initial Rheology—No Aging

| Sample No. | Conc (lb/bbl) | YP | 10 Sec. Gel | 10 Min. Gel |
|---|---|---|---|---|
| Blank | | 76 | 60 | 80 |
| 1 (Acrylic Acid/Acrylamide Sulfoethylacrylamide) | 0.5 | 28 | 33 | 76 |
| 2 (Acrylic Acid/Acrylamide/Sulfoethylacrylamide) | 0.5 | 22 | 27 | 100 |
| 3 (Acrylic Acid/Acrylamide Sulfoethylacrylamide) | 0.5 | 22 | 22 | 93 |
| 4 (Acrylic Acid/Acrylamide/Sulfomethylacrylamide) | 0.5 | 24 | 25 | 86 |
| 5 Acrylic Acid/Acrylamide/Sulfomethylacrylamide) | 0.5 | 36 | 40 | 53 |
| 6 (Acrylic Acid/Acrylamide/Sulfomethylacrylamide) | 0.5 | 16 | 15 | 70 |

*YP = Yield Point. An effective deflocculant reduces the numerical value of the YP. Yield point, 10 second gel and 10 minute gel tests were determined according to the American Petroleum Institute document, API RP 13B, Section 2.

Aged at 150° F. Overnight

| Sample No. | Conc (lb/bbl) | YP | 10 Sec. Gel | 10 Min. Gel |
|---|---|---|---|---|
| Blank | | 265 | 172 | 220 |
| 1 (Acrylic Acid/Acrylamide Sulfoethylacrylamide) | 0.5 | 79 | 68 | 96 |
| 2 (Acrylic Acid/Acrylamide/Sulfoethylacrylamide) | 0.5 | 61 | 58 | 110 |
| 3 (Acrylic Acid/Acrylamide/Sulfoethylacrylamide) | 0.5 | 36 | 50 | 100 |
| 4 (Acrylic Acid/Acrylamide/Sulfomethylacrylamide) | 0.5 | 59 | 63 | 132 |

-continued

| Sample No. | Conc (lb/bbl) | YP | 10 Sec. Gel | 10 Min. Gel |
|---|---|---|---|---|
| 5 (Acrylic Acid/Acrylamide/ Sulfomethylacrylamide | 0.5 | 135 | 125 | 205 |
| 6 (Acrylic Acid/Acrylamide/ Sulfomethylacrylamide) | 0.5 | 42 | 45 | 70 |

*YP = Yield Point. An effective deflocculant reduces the numerical value of the YP. Yield point, 10 second gel and 10 minute gel tests were determined according to the American Petroleum Institute document, API RP 13B, Section 2.

We claim:

1. An improved high calcium containing aqueous drilling fluid containing clay particles and from 0.1–10 pounds per barrel of an acrylic acid/acrylamide/sulfophenyl acrylamide deflocculant terpolymer which has a molecular weight within the range of from 1,000 to 50,000, wherein the acrylamide and sulfophenyl acrylamide components are present in a total amount of 5–50 mole percent.

2. The drilling fluid of claim 1 wherein the terpolymer has a molecular weight within the range of 4,000 to 20,000.

* * * * *